March 9, 1954 W. H. DU BOIS 2,671,532
AIRPLANE WHEEL DISK BRAKE
Filed March 3, 1949 5 Sheets-Sheet 1

INVENTOR.
WILLIAM H. Du BOIS
BY
*G. A. Gust*
ATTORNEY

March 9, 1954 W. H. DU BOIS 2,671,532
AIRPLANE WHEEL DISK BRAKE
Filed March 3, 1949 5 Sheets-Sheet 4

INVENTOR.
WILLIAM H. DU BOIS
BY
*G. A. Gust*
ATTORNEY

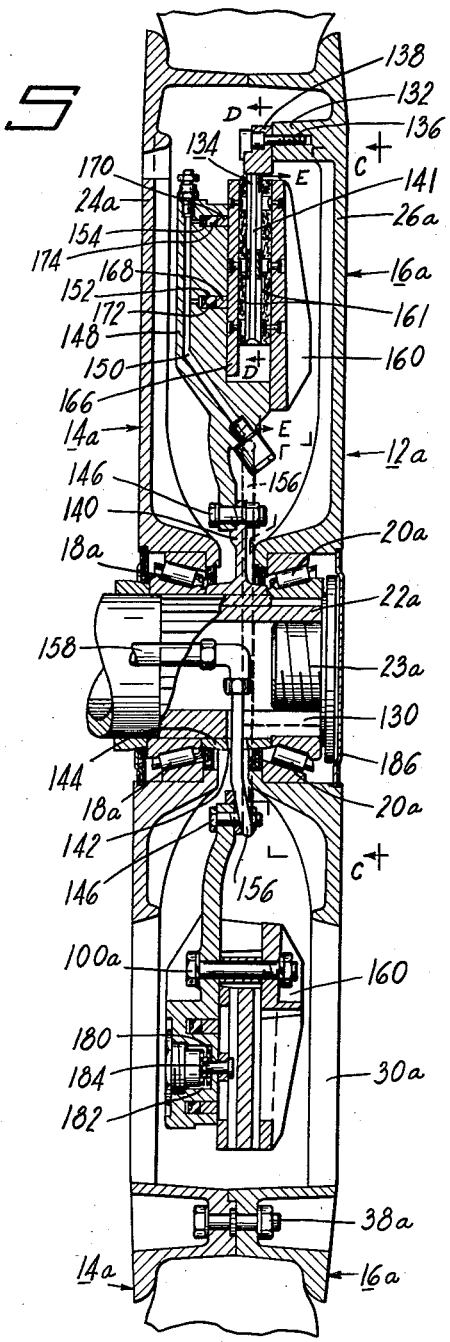

UNITED STATES PATENT OFFICE 2,671,532

AIRPLANE WHEEL DISK BRAKE

William H. Du Bois, South Bend, Ind., assignor to Bendix Aviation Corporation, South Bend, Ind., a corporation of Delaware Application March 3, 1949, Serial No. 79,505

9 Claims. (Cl. 188—18)

The present invention relates to an improved aircraft landing wheel and an enclosed disk brake.

The primary object of the present invention is to provide for an improved aircraft wheel and brake assembly wherein the wheel is designed for optimum strength for a given brake capacity.

A further object of the present invention is to provide for an aircraft wheel and disk brake combination in which the braking members are completely enclosed in the wheel structure, but not forming a part thereof.

A still further object of the present invention is to provide more effective cooling of braking elements whereby the use of a greater number of braking elements is made possible, which in turn makes available a greater amount of retarding torque.

A still further object is to provide an airplane wheel structure so arranged that a disk type brake can be designed to lie in contiguity with the inner rim periphery thereof and to extend radially inwardly a distance sufficient to utilize the maximum effective braking torque deliverable by the braking disks. It is well known that an increased mechanical advantage can be gained by increasing lever length; so by increasing the relative median diameter of a braking disk, as is done in the present invention, an increase in available retarding torque is obtained.

It is a still further object to provide a novel structural arrangement for actuating the brake and for connecting an energizing medium thereto.

One conventional mode of constructing an aircraft wheel with a plurality of brake disk members is to place such members on the outside of the wheel construction, with the wheel rim being centrally supported by a radial web section radiating from the wheel hub. The wheel is then of substantially T cross-section with the rim forming the cross-bar of the T and the web section forming the shank thereof. Obviously, such a wheel cannot withstand as much lateral or radial loading as a wheel of the same type having side supporting plates. By placing a disk brake of the conventional type inside the wheel, the center web section is replaced by two side supporting plates which provide for greater wheel strength for a given braking capacity, in a given overall wheel and brake width.

Another similar conventional aircraft wheel and brake design is one in which the wheel is of substantially inverted L-shaped cross-section. The shank of the L forms the side plate while the bar of the L serves as the wheel rim. The disk brake is carried in the area partly surrounded by the sides of the L. It is obvious that the objections inherent in the design of the T-section wheel are present here, the rim being of cantilever construction whereby the side plate must of necessity be relatively thick in cross-section to withstand the bending load exerted at the unsupported rim edge.

This necessary thickness of cross-section of both T and L shanks presents a disadvantage in that it causes the wheel and brake assembly to be unduly thick and cumbersome to retract into the wing sections. Thus by providing each edge of the rim with radial support plates, having a lesser combined thickness than that of the conventional wheel radial support plates, a lighter wheel for the same strength is produced which can take the same braking capacity as the conventional designs. As a corollary, a stronger wheel of the same width is produced into which may be incorporated a larger brake.

Other advantages to be found in the present invention arise from the particular structural arrangement of the parts thereof, and more specifically are to be found in the conception of enclosing a disk type brake in a wheel having air ventilating openings near the outer periphery thereof, the brake being comprised of a plurality of disks arranged in co-axial relation and disposed near the inner periphery of the wheel rim. This particular design provides for a large braking capacity by the use of an increased number of brake disks, made possible by more efficient cooling. In the aircraft wheel and brake art, the goal toward which engineers strive is increased brake capacity for a given strength wheel. The present arrangement achieves a marked advance toward this goal and does so by the utilization of a simple structure hereinafter to be described.

Further objects of the present invention will become apparent as the description proceeds.

Reference should be had to the accompanying drawings, in which:

Figure 5 is an axial section thereof taken substantially on section line 5—5 of Figure 4.

Figure 1:
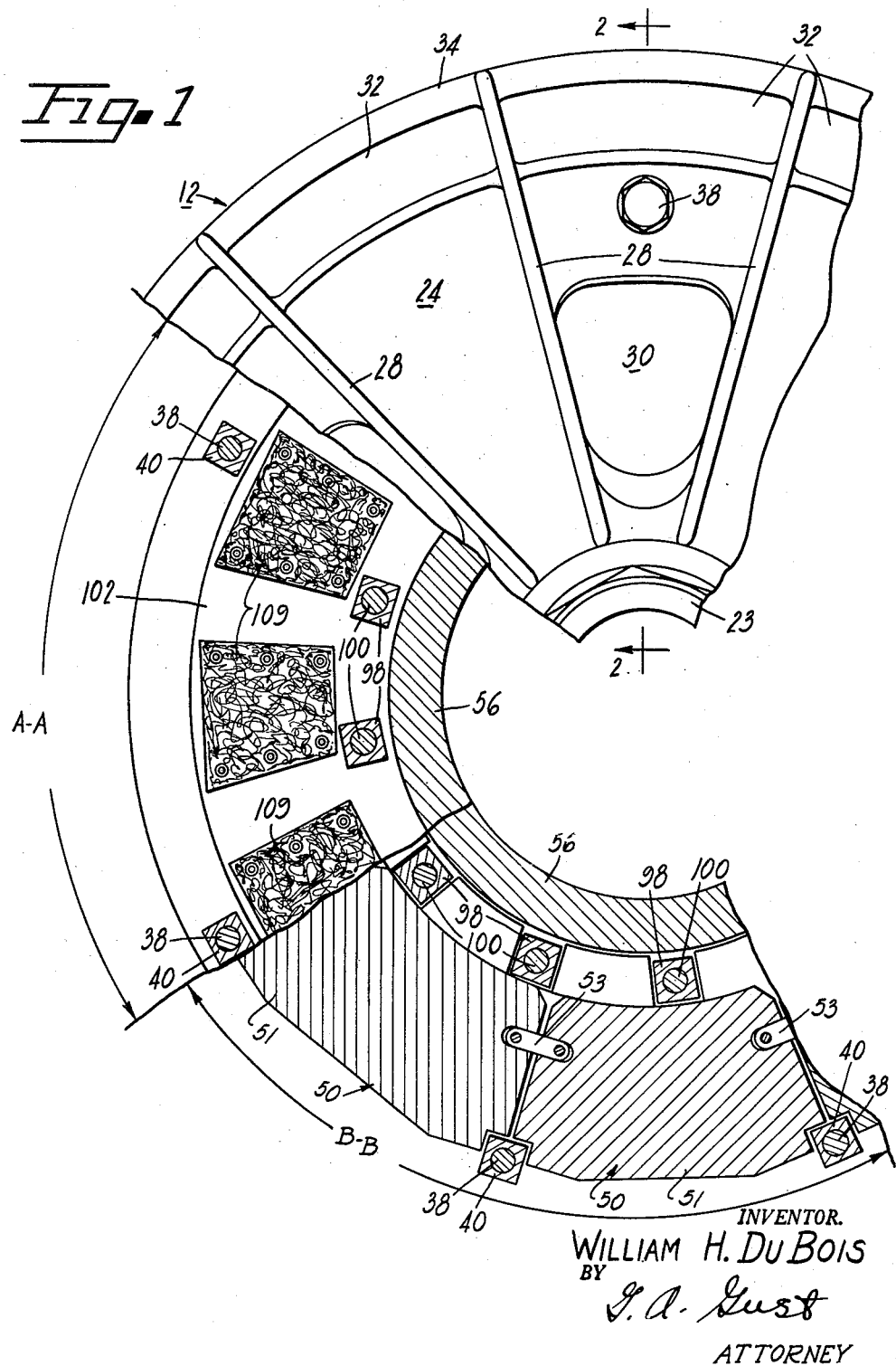
Figure 1 is a fragmentary side elevation of an embodiment of the present invention cut away in sections A—A and B—B as taken on section lines A—A and B—B, respectively, of Figure 2.
Figure 2:
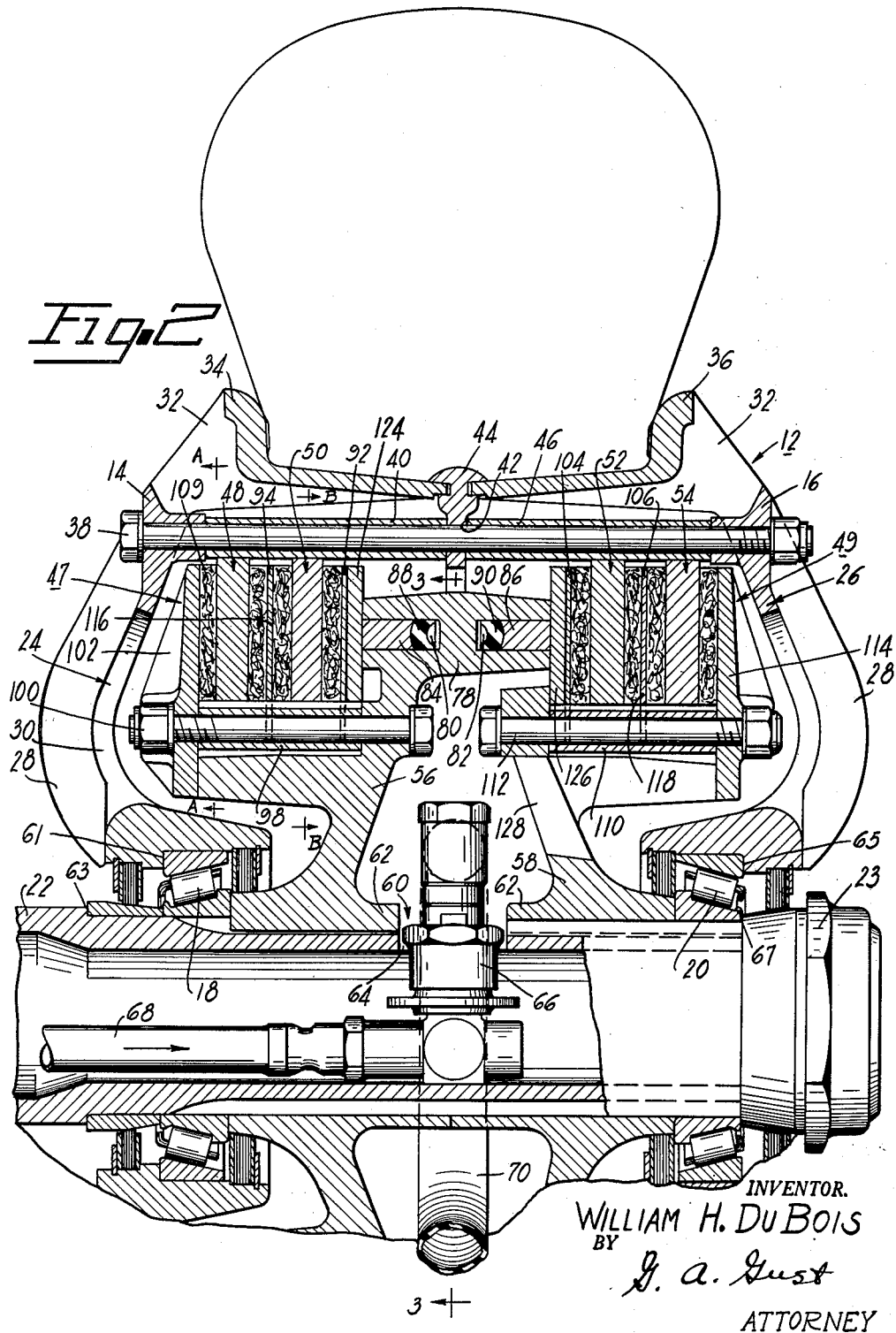
Figure 2 is a fragmentary axial section thereof taken substantially on section line 2—2 of Figure 1.
Figure 3:
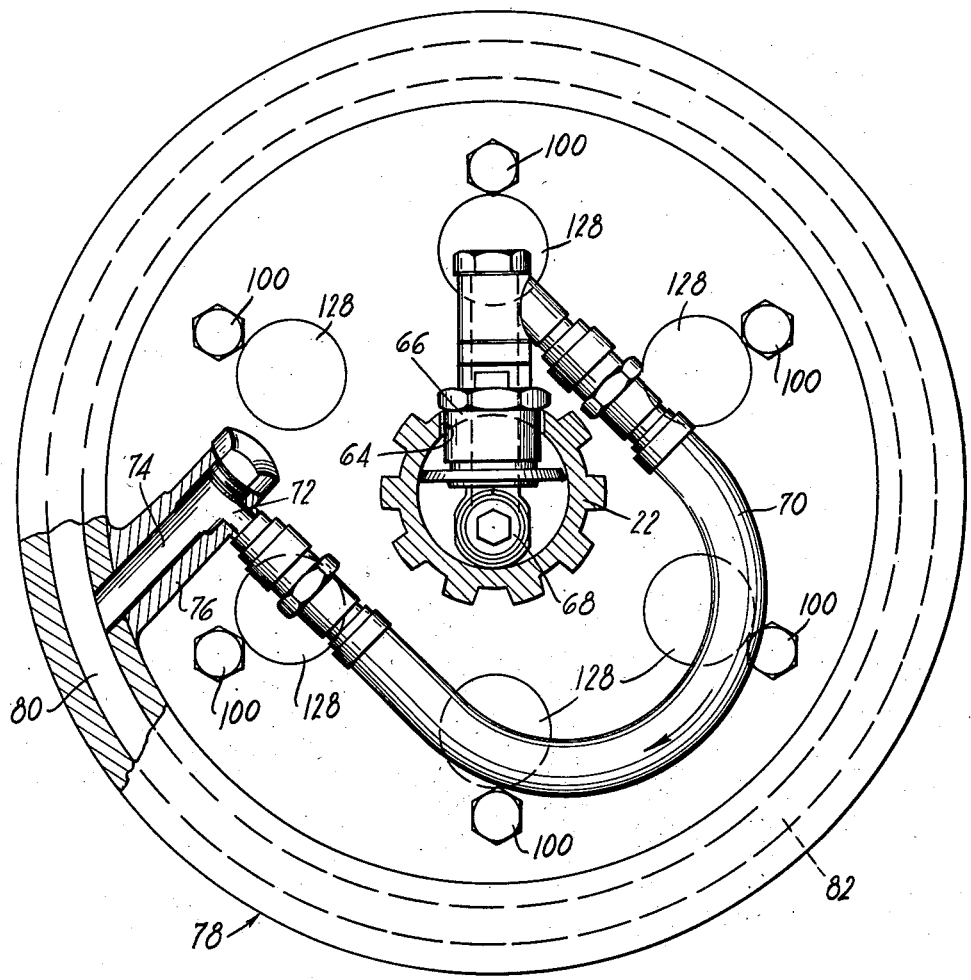
Figure 3 is a fragmentary section thereof taken substantially on section line 3—3 of Figure 2 illustrating the brake actuator and its associated fluid energizing system.

Referring to the drawings and more particularly to Figures 1, 2, and 3 thereof, a wheel 12 comprising two allochiral sections 14 and 16 is shown journaled by means of frictionless bearings 18 and 20 on hollow axle 22 and secured thereon by means of hub nut 23. Side plates 24 and 26 of sections 14 and 16, respectively, are formed with radial strengthening ribs 28, and circumferentially spaced openings 30, such openings 30 serving as ventilating exhausts and to lighten the overall weight of the wheel without sacrificing wheel strength. Ventilating openings 32 are located near the rim edges 34 and 36 and open radially to serve as air scoops. As illustrated in Figure 2, openings 32 have effective opening areas which face radially outwardly. As the wheel is carried in a forward direction air will flow directly into these forwardly presented openings in a manner hereinafter described.

A plurality of circumferentially spaced bolts 38, which pass through sleeve type driving keys 40, perforations 42 in rim retaining annulus 44, and similar keys 46, join wheel sections 14 and 16 together. By this arrangement, the keys 40 and 46 are compressed between the wheel sections 14 and 16 and retaining annulus 44 and are thereby held in fixed, rigid position with respect to said wheel sections. The wheel brake consists generally of two stacks or groups 47 and 49. In group 47 resides disk brake members 48 and 50 which are keyed for axial movement to key 40, and in group 49 resides similar brake members 52 and 54 which are similarly keyed to key 46. In Figure 1 is illustrated in detail these disk brake members which are constructed of circumferentially arranged arcuate segments 51 which are spaced apart and held together by means of links 53, the segments 51 being formed of a suitable metal composition such as cast iron.

Splined to axle 22 and confined between bearings 18 and 20 are torque-taking members, or stator carriers 56 and 58 formed to provide a circular opening 60 in the abutting hubs 62 thereof. These carriers are shown in two pieces but obviously may be integrally joined at the hub portions 62 which may then be considered as a single hub member 62. These hubs 62 are designed to desired axial length to form a bearing spacer which is abutted on each end thereof, respectively, by bearings 18 and 20. Bearing 18 operatively engages on its other side, a shoulder 61, formed in side plate 24, and a shoulder 63 on axle 22. Bearing 20 likewise operatively engages on its other side a similar shoulder 65 on side plate 26 and a peripheral portion 67 on hub nut 23.

The opening 60 registers with a companion opening 64 in axle 22 for the reception therethrough of a fluid conduit fitting 66 joined with fluid line 68 on the interior of axle 22 and joined at its other end with a curved fluid line 70. At its opposite end, line 70 communicates with the inner end 72 of the passage 74 in boss 76, which extends inwardly from annular cylinder block 78 and is preferably formed integrally with stator carrier 56. While the embodiment illustrated in Figures 1 and 3 is provided with only one cylinder block 78 mounted on one stator carrier, it is to be understood that the invention is not to be limited thereto inasmuch as block 78 could be divided into two abutting annular sections mountable on stator carriers 56 and 58, respectively.

Passage 74 communicates with two axially spaced annular chambers 80 and 82 in cylinder block 78, said chambers receiving therein for reciprocable movement two annular pistons 84 and 86, respectively. Fluid sealing rings 88 and 90 are positioned on the heads of pistons 84 and 86, respectively, to prevent leakage of pressure fluid from the respective chambers 80 and 82.

Annular stator brake members 92 and 94, interdigitated with brake members 48 and 50, are keyed to a plurality of sleeves 98 carried by bolts 100 which penetrate stator carrier 56, said bolts 100 serving to secure on the outer side of said carrier 56 an annular backing plate 102 against which piston 84 compresses its companion brake members. Other annular stator brake members 104 and 106, interdigitated with brake members 52 and 54, are similarly keyed to a plurality of sleeves 110 received on a like number of bolts 112 which penetrate stator carrier 58 to secure on the outer side thereof an annular backing plate 114 against which piston 86 compresses its companion brake members. While this embodiment of the present invention utilizes the number of brake members described and illustrated, it is to be understood that the invention is not to be limited thereto nor to any specific type of friction lining material which might be used on the brake members. Lining segments 109, arranged in circumferential spaced relation, are secured to backing plates 102 and 114 by any suitable means, and a similar lining arrangement is used on pressure plates 124 and 126 the combination of the lining and pressure plates forming, respectively, brake members 92 and 104. The pressure plates are keyed to sleeves 98 and 110, respectively, for axial movement thereon. Brake members 94 and 106 are constructed by securing lining segments on opposite sides of metal annuli 116 and 118, respectively, which are keyed for axial movement to bolts 100 and 112, respectively, these segments also being preferably arranged in circumferential spaced relation.

Release of the brakes may be accomplished by a plurality of circumferentially spaced compression springs (not shown) which urge the respective pressure plates 124 and 126 away from their companion backing plates.

In operation, line 68 communicates with a hydraulic fluid pressure generator, to conduct fluid pressure through this line to fitting 66, through line 70, passage 74 to chambers 80 and 82 to urge pistons 84 and 86, respectively, outwardly to cause pressure plates 124 and 126 to bring the several brake members into engagement. The admission of fluid pressure to said chambers 80 and 82, may, of course, be regulated by a manually manipulable control mounted on the aircraft.

As wheel 12 rotates, the openings 32 direct a stream of air directly upon the brake members, through the spaces between the lining segments and the rotor segments, through apertures 128 in stator carriers 54 and 56 and out of openings 30 in side plates 24 and 26 and other rearwardly facing openings 32. By this construction, the hot air which accumulates around the brake disks is effectively scavenged and the disks are cooled by the passing currents of air.

Figure 4:
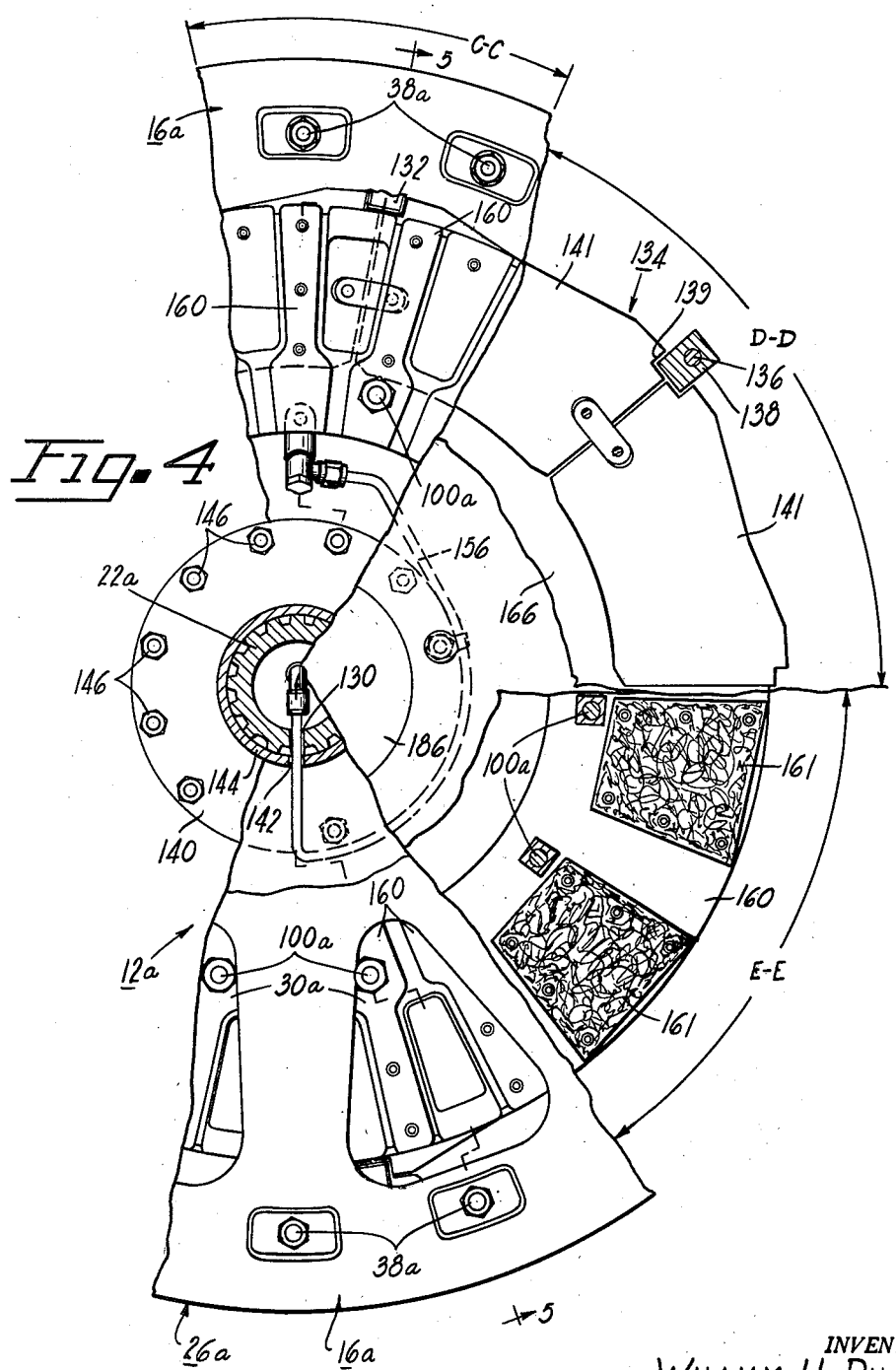
Figure 4 is a fragmentary side elevation of another embodiment of the present invention cut away in sections C—C, D—D, and E—E as taken on section lines C—C, D—D, and E—E, respectively, of Figure 5.

Another form of the present invention is illustrated in Figures 4 and 5 wherein two wheel sections 14a and 16a are secured together near the outer peripheries thereof by a plurality of bolts 38a to form a wheel 12a. Wheel 12a is journaled on hollow axle 22a by means of bearings 18a and 20a and is secured thereon by means of hub nut 23a threadedly received in the end of axle 22a. Axle 22a is provided with an axial slot 130 having an open end adjacent the hub nut 23a, the purpose of which is hereinafter explained.

Wheel 12a has two side supporting plates 24a and 26a which are formed with circumferentially spaced openings 30a to provide for ventilation of the enclosed brake members and to lighten the aggregate wheel weight.

A plurality of rotor carrying projections 132 are preferably formed integral with the inner side of side support plate 26a near the outer periphery thereof to receive thereon for axial movement a brake member 134 which rotates with the wheel 12a.

Each of the projections 132 threadedly receives a bolt 136 to secure thereto a key member 138 which is engaged by respective notches 139 in adjacent rotor segments 141. By this arrangement, the rotor 134 formed by segments 141 is capable of axial movement while being rotated by members 138.

A single stator member 140 is splined to axle 22a between bearings 18a and 20a. A radial perforation 142 is provided in the hub 144 of stator member 140 and is arranged to register with the slot 130 in axle 22a. On the outer peripheral edge of stator 140 is secured, by means of a plurality of circumferentially spaced bolts 146, a disk-shaped cylinder block member 148 which forms the dual function of carrying the brake actuating mechanism as well as the stator brake members to be more fully described later. A substantially radial fluid passage 150 in member 148 leads to a pair of concentrically arranged annular chambers 152 and 154 contained in member 148. The other end of passage 150 is connected by means of conduit 156 admitted through perforation 142 to another conduit 158 carried inside axle 22a, this latter mentioned conduit 158 being connected to a fluid pressure generator carried by the aircraft.

A plurality of carrier bolts 100a pass through companion perforations in the member 148 to secure in place, the backing plate 160, and to provide a key type mounting for pressure plate 166 situated adjacent the open ends of chambers 152 and 154. Lining segments 161, arranged in circumferential spaced relation, are secured to the backing plate 160 and the pressure plate 166. Reciprocably carried in chambers 152 and 154 are, respectively, a pair of annular pistons 168 and 170 which have on the heads thereof annular fluid sealing rings 172 and 174, respectively. Movement of pistons 172 and 174 towards the right will cause pressure plate 166 to bring the respective friction disks into engagement with backing plate 160.

In operation fluid under pressure is introduced by some manually manipulable means from the fluid pressure generator into line 158, line 156, passage 150, and thence to the heads of pistons 168 and 170. These pistons are urged toward the right to engage pressure plate 166 and to compress the rotor 134 between said pressure plate and backing plate 160.

In order to maintain the brakes in released position a plurality of release springs 180 are preferably carried in a socket or cavity 182 in member 148 under compression to urge the floating headed pin 184, which is affixed to pressure plate 166, towards the left.

An important feature of this latter embodiment of the present invention is the axial slot 130 in axle 22a. Since line 156 is preferably constructed of substantially rigid, self-supporting conduit material, mounting of the wheel 12a upon axle 22a becomes an important problem. By using a slot 130 instead of a perforation in axle 22a, the entire wheel and enclosed brake assembly is mounted as a unit on axle 22a with conduit 156 passing into slot 130. Hub nut 23a is then screwed into position against bearing 20a to secure the wheel in place and to close the open end of axle 22a. A wheel hub closure plate 186 is then snapped into position to close the axle opening in the wheel.

As illustrated in Figures 2 and 5, it is seen that the wheels are essentially comprised of two side plates which are journaled on an axle and secured to a tire rim. Any lateral stresses which are set up in either of the wheels are taken by the respective side plates. This type of construction is obviously superior to that wherein the radial wheel support is disposed centrally or on only one side of the wheel, for the reasons stated in the opening statements of the objects and purposes of this invention.

Although only two embodiments of the present invention have been illustrated and described, it will be obvious to those skilled in the art that various changes in the form and arrangement of the parts may be made without departing from the scope of the invention.

I claim:

1. A wheel and brake for use on aircraft comprising a first side supporting plate having circumferentially spaced openings therein near its center, a first rim section secured to the outer periphery thereof, said rim section lying in a plane substantially at right angles to the plane of said first supporting plate, ventilating openings disposed about the outer circumference of said first supporting plate and opening in a radial direction, a second side supporting plate having circumferentially spaced openings therein near its center, a second rim section secured to the outer periphery thereof, said second rim section lying in a plane substantially at right angles to the plane of said second supporting plate, ventilating openings disposed about the outer circumference of said second supporting plate and opening in a radial direction, a rim-joining annulus engaging the inner ends of said rim sections to hold them in co-axial relation, a plurality of circumferentially spaced bolts penetrating said side plates near the outer peripheries thereof to hold them in fixed axial relationship, said bolts also penetrating said rim-joining annulus to be centrally supported thereby, a pair of sleeves received on each of said bolts and located on opposite sides of said rim-joining annulus, a plurality of co-axially disposed axially spaced rotatable annular brake members carried on said sleeves and movable axially thereon, a pair of stator carriers co-axially arranged between said side supporting plates and having hubs which are arranged in abutting relation to provide a spacer bearing, said hubs being formed to provide a radial opening, a plurality of bolts received in circumferentially spaced openings in each of said stator carriers, an annular co-axially disposed pressure plate mounted on the inner side of each of said stator carriers by means of said stator bolts and movable axially thereon, an annular stator brake member carried on each of said stators and movable axially on said stator bolts, said stator brake member being mounted between two of said rotatable brake members, an annular co-axially disposed backing plate fixedly mounted on the outer side of each of said stator carriers by means of said stator bolts, each of said pressure plates being movable axially toward the respective backing plate to compress the associated brake members therebetween, an annular co-axially disposed cylinder block interposed between said pressure plates in abutting relation therewith and carried by one of said stator carriers, an annular piston reciprocably mounted in each end of said cylinder block and movable to urge the respective pressure plate toward the respective backing plate, a fluid conduit fitting extending through the opening in said stator carrier hubs, a curved fluid conduit having one end connected to said fluid conduit fitting, and a boss extending inwardly from said cylinder block and having a passage which communicates at one end with said pistons and at the other end with said fluid conduit.

2. A wheel and brake for use on aircraft comprising a first side supporting plate having circumferentially spaced openings therein, a first rim section secured to the outer periphery thereof, said rim section lying in a plane substantially at right angles to the plane of said first supporting plate, a second side supporting plate having circumferentially spaced openings therein, a second rim section secured to the outer periphery thereof, said second rim section lying in a plane substantially at right angles to the plane of said second supporting plate, a rim joining annulus engaging the inner ends of said rim sections to hold them in co-axial relation, a plurality of circumferentially spaced bolts penetrating said side plates near the outer peripheries thereof to hold them in fixed aixal relationship, a pair of sleeves received on each of said bolts, a plurality of axially spaced rotatable annular brake members carried on said sleeves and movable axially thereon, a pair of stator carriers co-axially arranged between said side supporting plates, a plurality of axially aligned bolts received in circumferentially spaced perforations in each of said stator carriers, an annular pressure plate mounted on the inner side of each of said stator carriers by means of said stator bolts and movable axially thereon, an annular stator brake member carried by each of said stators and movable axially on said stator bolts, said stator brake member being mounted between two of said rotatable brake members, an annular backing plate fixedly mounted on the outer side of each of said stator carriers by means of said stator bolts, each of said pressure plates being movable axially toward the respective backing plate to compress the associated brake members therebetween, an annular cylinder block interposed between said pressure plates in abutting relation therewith and carried by one of said stator carriers, an annular piston reciprocably mounted in each end of said cylinder block movable to urge the said pressure plate toward the respective backing plate, and means for conducting fluid pressure to the inner ends of said pistons.

3. A wheel and brake for use on aircraft comprising a first side supporting plate having circumferentially spaced openings therein, a first rim section secured to the outer periphery thereof, said rim section lying in a plane substantially at right angles to the plane of said first supporting plate, ventilating openings disposed about the outer circumference of said first supporting plate and opening in a radial direction, a second side supporting plate having circumferentially spaced openings therein, a second rim section secured to the outer periphery thereof, said second rim section lying in a plane substantially at right angles to the plane of said second supporting plate, ventilating openings disposed about the outer circumference of said second supporting plate opening in a radial direction, a plurality of circumferentially spaced bolts fastening said side plates together to form a wheel, a plurality of annular brake members carried by said bolts and adapted to move axially thereon, a pair of stator carriers co-axially arranged between said side supporting plates, an annular co-axially disposed pressure plate mounted for axial movement on the inner side of each of said carriers, an annular stator brake member mounted for axial movement on each of said carriers in interleaving relation with said rotatable brake members, an annular backing plate secured on the outer side of each of said carriers, said stator brake member being positioned between the respective backing plate and pressure plate, an annular cylinder block interposed between said pressure plates in abutting relation therewith and secured to one of said carriers, an annular piston reciprocably mounted in each end of said cylinder block and movable to urge said pressure plates toward the respective backing plates, and means for conducting fluid pressure to the inner ends of said pistons.

4. An airplane wheel and brake comprising cup-shaped allochiral sections joined at the edges thereof, a plurality of circumferentially spaced bolts positioned near the outer periphery of said wheel to secure said sections together, annular brake member carrier sleeves received on each of said bolts, a plurality of axially spaced annular friction disks mounted at their outer peripheries for axial movement on said sleeves, a pair of disk shaped torque-taking stators having their peripheries positioned in contiguity with the inner peripheries of said friction disks, a plurality of axially spaced annular brake disks mounted at their inner peripheries on said stators for axial movement thereon, and non-rotatable means positioned at the axial center of and between said disks to bring them into frictional engagement.

5. For use with a wheel, a brake comprising a plurality of circumferentially spaced fastening members adapted to be secured near the periphery of said wheel, a pair of stacks of axially spaced co-axially disposed annular brake members keyed to said fastening members for axial movement thereon, a pair of separately mounted annular disconnected torque-taking members, axially spaced apart at their outer peripheral portions and abutting at the inner axial portions, a single fastening element carried at the axis of said wheel for holding the two separate torque-taking members in abutting relationship at that region, a stack of axially spaced co-axially disposed annular brake members carried on each of said torque-taking members in interleaving relation with the respective stack of a said pair of stacks, an annular cylinder block interposed between said stacks, an annular piston carried in each end of said block to urge said brake members into frictional engagement, and a fluid carrying conduit having one end in communication with the heads of said pistons and the other end connected to fluid pressure, said brake being carried internally of said wheel.

6. For use with a wheel and mounted internally thereof, a plurality of circumferentially spaced bolts adapted to be secured near the periphery thereof, a pair of stacks of axially spaced co-axially disposed annular friction members keyed for axial movement on said bolts, two non-rotatable torque-taking members, a second pair of stacks of axially spaced co-axially disposed annular friction members in interleaving relation with said first pair mounted for axial movement on said torque members, an annular cylinder block interposed between said stacks and carried by one of said torque members, an annular piston carried in each end of said block to urge said friction members into braking engagement, and a fluid carrying conduit having one end in communication with the heads of said pistons and the other end connectable to a source of fluid pressure.

7. For use with a wheel and mounted internally thereof, a plurality of circumferentially spaced bolts adapted to be secured near the periphery thereof, a pair of stacks of axially spaced co-axially disposed annular friction members keyed for axial movement on said bolts, a second pair of stacks of axially spaced co-axially disposed annular friction members in interleaving relation with said first pair of stacks, a separate torque-taking member for each of said second pair of stacks, said torque-taking members being axially spaced apart from each other, an annular cylinder block interposed between said stacks and carried by one of said torque members, an annular piston carried in each end of said block to urge said sections into frictional engagement, and means for applying fluid pressure to said pistons.

8. A wheel and brake for use on aircraft comprising a first side supporting plate, a first rim section secured to the outer periphery thereof, said rim section lying in a plane substantially at right angles to the plane of said first supporting plate, a second side supporting plate, a second rim section secured to the outer periphery thereof, said second rim section lying in a plane substantially at right angles to the plane of said second supporting plate, a plurality of circumferentially spaced bolts fastening said side plates together to form a wheel, a plurality of annular brake members carried by said bolts and adapted to move axially thereon, a pair of stator carriers arranged between said side supporting plates, an annular pressure plate mounted for axial movement on the inner side of each of said carriers, at least one annular stator brake member mounted for axial movement on each of said carriers in interleaving relation with said rotatable brake members, an annular backing plate secured on the outer side of each of said carriers, the stator brake members being positioned between the respective backing plate and said pressure plate, an annular cylinder block interposed between said pressure plates and secured to one of said carriers, an annular piston reciprocably mounted in each end of said cylinder block and movable to urge said pressure plates toward the respective backing plates, and means for conducting fluid pressure to the inner ends of said pistons.

9. A wheel and brake assembly comprising a wheel having axially spaced sides, a plurality of circumferentially spaced axially extending key members secured to said sides near the outer periphery of said wheel, a plurality of friction elements rotatable with said wheel and keyed to said key members for axial movement, two axially spaced nonrotatable carriers arranged between said sides, each of said carriers being provided with a nonrotatable backing plate on the axially outer side thereof, a plurality of nonrotatable friction elements carried for axial movement on said carriers toward the corresponding backing plates, and a cylinder block interposed between said carriers and reciprocably receiving in each end thereof pistons which may be actuated to produce frictional engagement of said friction elements and the corresponding backing plates.

WILLIAM H. DU BOIS.

References Cited in the file of this patent

UNITED STATES PATENTS

| Number | Name | Date |
|---|---|---|
| 1,998,917 | Apple | Apr. 23, 1935 |
| 2,059,170 | Farr | Oct. 27, 1936 |
| 2,089,996 | Fast | Aug. 17, 1937 |
| 2,267,263 | Berger et al. | Dec. 23, 1941 |
| 2,352,829 | Forbes | July 4, 1944 |
| 2,381,166 | Hollerith | Aug. 7, 1945 |
| 2,381,941 | Wellman | Aug. 14, 1945 |
| 2,386,477 | Kraft | Oct. 9, 1945 |
| 2,410,470 | Wallace | Nov. 5, 1946 |
| 2,423,882 | Frank | July 15, 1947 |
| 2,431,667 | Frank | Nov. 25, 1947 |

FOREIGN PATENTS

| Number | Country | Date |
|---|---|---|
| 438,947 | Italy | Sept. 3, 1948 |
| 100,179 | Sweden | Nov. 5, 1940 |